(No Model.)
C. A. BARTLIFF.
FILTER FOR RAIN WATER.
No. 441,121. Patented Nov. 25, 1890.
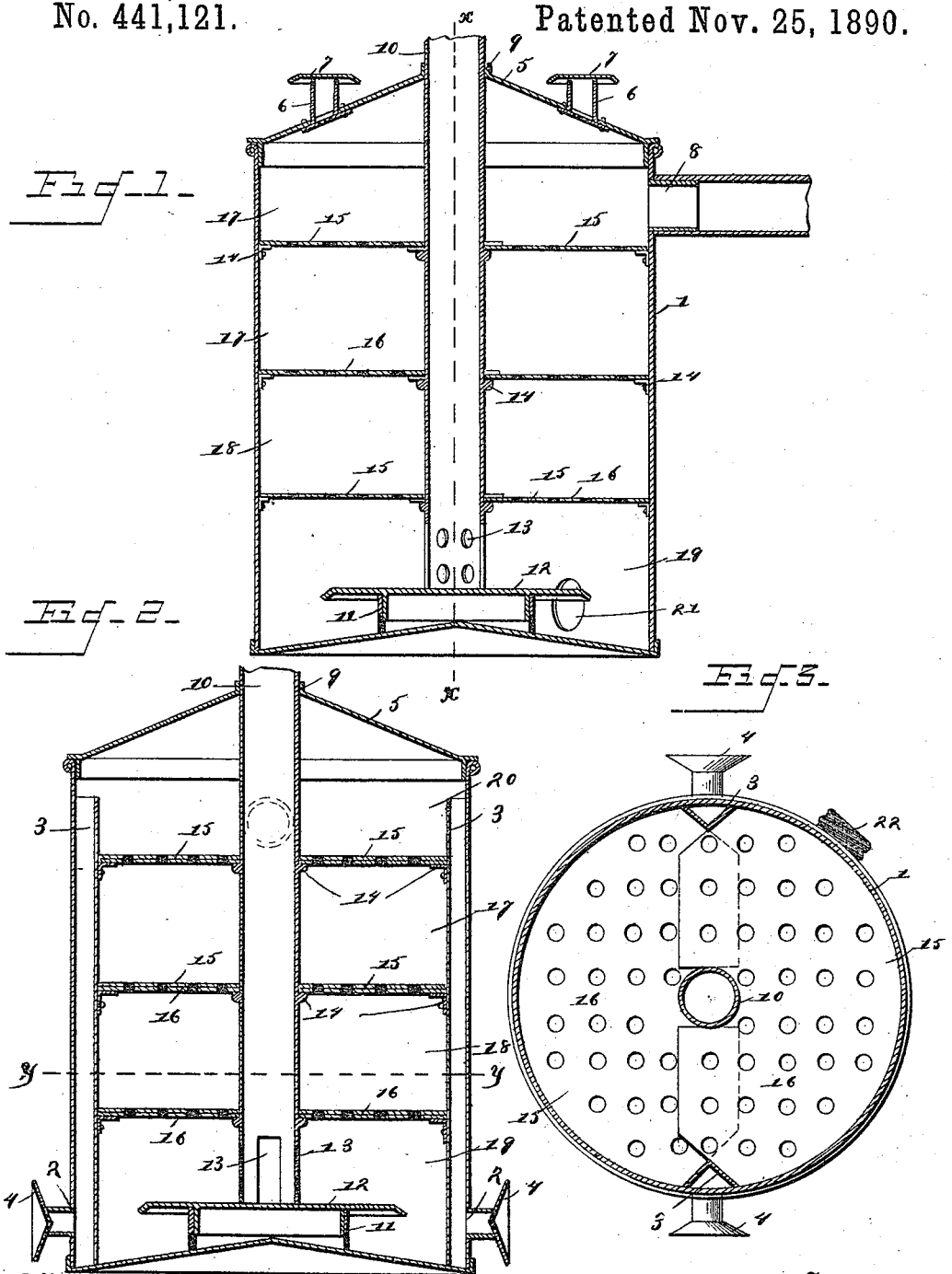
Witnesses
Geo. E. Fuch.
Wm. Bagger.
Inventor
Charles A. Bartliff
By his Attorneys
C. A. Snow & Co.

UNITED STATES PATENT OFFICE.

CHARLES A. BARTLIFF, OF MEMPHIS, TENNESSEE.

FILTER FOR RAIN-WATER.

SPECIFICATION forming part of Letters Patent No. 441,121, dated November 25, 1890.

Application filed December 14, 1889. Serial No. 333,758. (No model.)

*To all whom it may concern:*

Be it known that I, CHARLES A. BARTLIFF, a citizen of Canada, residing at Memphis, in the county of Shelby and State of Tennessee, have invented a new and useful Filter for Filtering Rain-Water, of which the following is a specification.

This invention relates to filters for filtering and purifying rain-water before it enters the cistern in which it is collected; and it has for its object to provide a device of this class which shall be exceedingly simple in construction and inexpensive and at the same time thoroughly efficient in operation.

With these ends in view the invention consists in the improved construction, arrangement, and combination of parts, which will be hereinafter fully described, and particularly pointed out in the claims.

In the drawings, Figure 1 is a vertical sectional view of my improved filter and water-purifier. Fig. 2 is a vertical sectional view of the same, taken on the line $x\,x$ in Fig. 1. Fig. 3 is a horizontal sectional view taken on the line $y\,y$ in Fig. 2.

Like numerals of reference indicate like parts in all the figures.

1 designates a cylindrical tank, which is provided near its lower ends with openings 2 2, connected with the lower ends of air-tubes 3 3, constructed vertically in the said cylindrical tank on the diametrically-opposite sides of the latter. The openings 2 2 are provided with funnels 4, closed at their outer ends and having numerous small perforations for the admission of air. The air-tubes 3 3 are extended nearly to the upper edge of the tank, as will be clearly seen in Fig. 2 of the drawings. The tank is provided with a cover 5, having air-inlet tubes 6, which are provided with caps 7 to exclude dust and other impure matter. Near the upper end of the tank is an exit-pipe 8 for the escape of the filtered water. The cover 5 has a central opening 9, through which extends the inlet-pipe 10, which extends nearly to the bottom of the tank. The latter is provided with an annular rim 11, supporting a cap 12, which I term the "sediment-holder," and which will permit the sediment to settle in the bottom of the tank without being agitated or disturbed by the water entering the tank. The inlet-tube 10 is provided at its lower end with openings 13 for the escape of water.

The tube 10 and the inner walls of the tank are provided with supports 14 for the diaphragms 15, of which three are used, located suitable distances apart. Each of said diaphragms is preferably constructed of two separate perforated plates or sections 16 16, adapted to slightly overlap each other and provided with notches to accommodate the inlet-pipe 10 and the air-pipes 3. The spaces between the perforated diaphragms form the packing-chambers 17 and 18, which are packed, respectively, with granulated charcoal and with sharp fine sand, which forms a very efficient filtering packing. The space 19 below the lowermost diaphragm 15 is the inlet-chamber, and the uppermost space 20 is the pure-water chamber.

The operation of my invention and its advantages will be readily understood from the foregoing description, taken in connection with the drawings hereto annexed. The upper end of the inlet-pipe 10 is connected with the discharge-pipe, through which the water is conducted from the roof, and the outlet-pipe 8 is connected with a pipe leading to the cistern. It will thus be seen that the water as it is being gathered is conducted through the inlet-pipe to the chamber or compartment 19 in the bottom of the filter, passing from thence in an upward direction through the filtering material contained in the packing-chambers and into the chamber 20, from whence the filtered water escapes into the cistern. The several air-inlets serve to supply pure air to the interior of the filtering-chamber, and foul or vitiated air may escape from the cistern through the same openings. A discharge-opening 21 near the lower end of the filtering-tank is provided with a screw-cap 22, which may be readily removed. When it is desired to cleanse the tank, this cap is detached, and the contents of the chamber 19 will then escape with a rush, carrying with it any sediment which may have settled in the bottom of the said chamber. When rain-water is conveyed from the roof of a building to a cistern, it is customary to provide the water pipe or spout with a cut-off, through which the water may at first be permitted to run to waste until the roof shall have to some extent been cleansed of impurities, after which the flow is directed to the cistern. This is objectionable for many reasons, principally because a considerable portion of the water is wasted, and for the further reason that in hot weather many impurities become so firmly attached to the roof as to be only very gradually detached. The water in the cistern, as a result, always is more or less contaminated. By my invention these disadvantages are entirely overcome. All the water may be saved, and only pure and filtered water is permitted to enter the cistern. It also becomes unnecessary to expose one's self to the rain for the purpose of regulating the water cut-off.

Having thus described my invention, I claim—

1. In a filter and water-purifier, the combination of the tank, the inlet-pipe extending through the cover and nearly to the bottom of the tank, the exit-pipe arranged near the upper end of the tank, the two-part or bisected perforated diaphragms forming the packing-chambers and mounted removably on supports on the inlet-pipe and upon the inner wall of the tank, and the air-tubes constructed interiorly in the tank, extending nearly to the upper end of the same, where they open into the filtered-water compartment, and connected at their lower ends with openings formed near the lower end of the tank and surrounded by funnels having perforations for the admission of air, substantially as set forth.

2. The combination, with the filtering-tank, of the inlet-pipe having annular flanges or supports, the supports upon the inner walls of the tank, and the perforated diaphragms, each composed of two separate sections arranged upon the said supports and forming the packing-chambers, substantially as set forth.

3. The combination of the filtering-tank, the annular rim or flange upon the bottom of the latter, the plate or cap secured upon said flange and forming a sediment-holder, the discharge-pipe arranged near the lower end of the tank and having a screw cap or cover, and the inlet-pipe extending vertically through the tank and having inlet-openings at its lower end, substantially as and for the purpose set forth.

In testimony that I claim the foregoing as my own I have hereto affixed my signature in presence of two witnesses.

CHARLES A. BARTLIFF.

Witnesses:
OTTO ZIMMERMANN,
F. ZIMMERMANN.